US007774539B2

(12) United States Patent
Mettler et al.

(10) Patent No.: US 7,774,539 B2
(45) Date of Patent: *Aug. 10, 2010

(54) PRESERVATION OF HARD DRIVE DATA VIA DYNAMIC BAND BOUNDARY DEFINITION

(75) Inventors: Michael S. Mettler, Durham, NC (US); Daryl Cromer, Cary, NC (US); Matthew B. Griffith, Raleigh, NC (US); Jeffrey R. Hobbet, Holly Springs, NC (US); Scott D. Ruppert, Durham, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 639 days.

This patent is subject to a terminal disclaimer.

(21) Appl. No.: 11/985,726

(22) Filed: Feb. 7, 2007

(65) Prior Publication Data

US 2008/0189469 A1   Aug. 7, 2008

(51) Int. Cl.
*G06F 12/00* (2006.01)
(52) U.S. Cl. .................. 711/112; 711/100; 711/111; 360/60
(58) Field of Classification Search .............. 711/4, 711/100, 111, 112; 360/53, 60
See application file for complete search history.

(56) References Cited

U.S. PATENT DOCUMENTS

| 6,178,054 | B1 | 1/2001 | Wakefield |
| 6,181,493 | B1 | 1/2001 | Wakefield |
| 6,421,197 | B1 | 7/2002 | Abdelnour |
| 6,853,511 | B2 | 2/2005 | Seng et al. |
| 7,206,990 | B2 | 4/2007 | Su et al. |
| 2005/0243698 | A1 | 11/2005 | Yamanaka |
| 2007/0074083 | A1* | 3/2007 | Olds et al. ............ 714/54 |

FOREIGN PATENT DOCUMENTS

| JP | 05-257617 | 10/1993 |
| JP | 2001-118343 | 4/2001 |
| JP | 2004-273060 | 9/2004 |
| JP | 2004-303303 | 10/2004 |
| JP | 2005-322399 | 11/2005 |
| JP | 2006-286128 | 10/2006 |
| JP | 2006-294231 | 10/2006 |

* cited by examiner

*Primary Examiner*—Jasmine Song
(74) *Attorney, Agent, or Firm*—Ference & Associates LLC

(57) ABSTRACT

Systems and methods for managing adjacent track interference in a hard drive. An adjacent track interference potential is ascertained in a region of the hard drive, and data corruption is averted via scrubbing data in the region with ascertained adjacent track interference potential, wherein limits of this region are defined.

26 Claims, 3 Drawing Sheets

PRESERVATION OF HARD DRIVE DATA VIA DYNAMIC BAND BOUNDARY DEFINITION

FIELD OF THE INVENTION

The present invention relates to hard drives and problems encountered therewith, particularly adjacent track interference, and methods, arrangements and modules for addressing such problems.

BACKGROUND OF THE INVENTION

In the realm of hard drives, adjacent track interference (ATI) is a growing problem. When a particular track on the hard drive is written a large number of times (e.g., 30,000 times or more) without the adjacent track(s) being written, then the data on those adjacent track(s) can become corrupted. This constant overwrite causes some magnetic flux interference on the adjacent tracks that, over many cycles, can accumulate and leave the adjacent tracks unreadable.

For example, consider a track X as having adjacent tracks X+1 and X−1. If track X is written a large number of times before tracks X+1 or X−1 are also written, then the data on X+1 or X−1 could become corrupted. This is a well documented interaction encountered in magnetic recording.

A seemingly simple solution to this problem involves writing the data to the adjacent tracks before the data can become corrupted. However, complications arise in deciding when and how to rewrite the data on these tracks. There is no simple counter of how many times the data at any particular sector is accessed; thus, it is essentially never clearly known as to when interference is about to take place. Currently, there are no known effective solutions to adjacent track interference in use at either the hard drive firmware level or the OS/application/driver level. Inasmuch as the first clear indication of ATI is that data has already become corrupted, it would simply be too late to merely save the data at that point, and the files involved would already be lost.

An aggregating factor with ATI is areal density. As the areal density increases, the physical area containing the data decreases, thus increasing the percentage of area that represents a "fringe" or "border" area with respect to an adjacent track. Since, with ongoing technological developments, there will continue to be a significant increase in the number of tracks, areal density correspondingly increases. As such trends continue among the physical dimensions and physics of media and write mechanisms, the potential for increasing exposure to ATI will correspondingly increase.

As ATI problems have continued to proliferate, it has been found that common operating system programs have a tendency to cause a large number of writes to specific locations on hard drives. The data on the drives become corrupt when the excessive writes occur, and this often makes the systems unbootable. Indeed, this problem is growing due to increased areal density and OS workload while, at the same time, programs that access and update the information on the hard drive frequently can cause ATI.

SUMMARY OF THE INVENTION

There are broadly contemplated herein, in accordance with at least one presently preferred embodiment of the present invention, new methods and systems for detecting potential ATI problems within bands (groupings of tracks) on a hard drive and scrubbing such a band before data becomes corrupt.

In summary, one aspect of the invention provides a method comprising: ascertaining an adjacent track interference potential in a region of the hard drive; and averting data corruption via scrubbing data in the region with ascertained adjacent track interference potential; said ascertaining comprising defining limits of a region of the hard drive to be scrubbed of data.

Another aspect of the invention provides a system comprising: a processor; and a memory storing code accessible by the processor to: ascertain an adjacent track interference potential in a region of the hard drive; and avert data corruption via scrubbing data in the region with ascertained adjacent track interference potential; the ascertainment acting to define limits of a region of the hard drive to be scrubbed of data.

Furthermore, an additional aspect of the invention provides a program storage device readable by machine, tangibly embodying a program of instructions executable by the machine to perform acts, said acts comprising: ascertaining an adjacent track interference potential in a region of the hard drive; and averting data corruption via scrubbing data in the region with ascertained adjacent track interference potential; said ascertaining comprising defining limits of a region of the hard drive to be scrubbed of data.

A further aspect of the invention provides a system comprising: a graphics adapter; a processor; and a memory storing code accessible by the processor to: ascertain an adjacent track interference potential in a region of a hard drive; and avert data corruption via scrubbing data in the region with ascertained adjacent track interference potential; the ascertainment acting to define limits of a region of the hard drive to be scrubbed of data.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
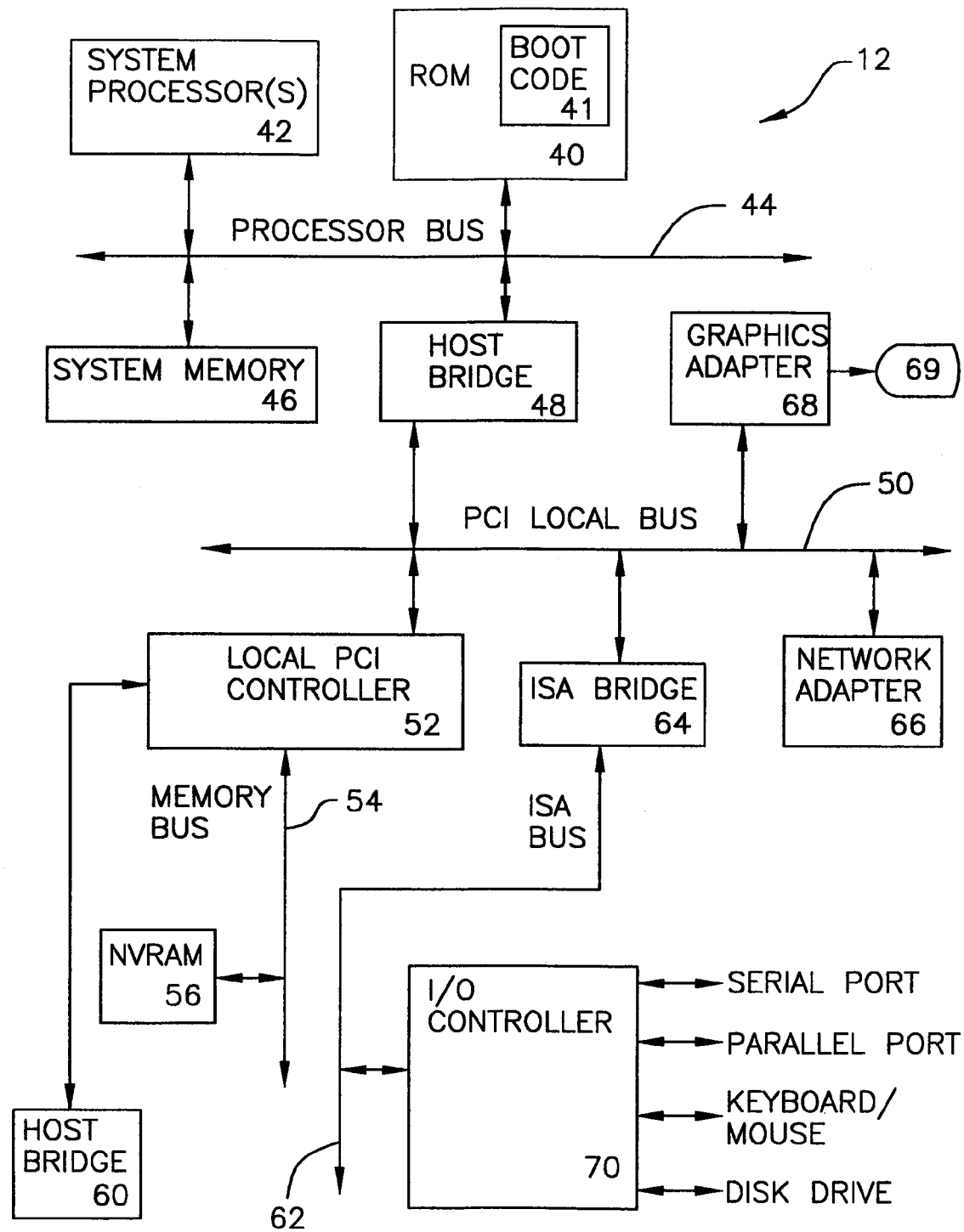
FIG. 1 is a block diagram of a computer system according to a preferred embodiment of the present invention.
Figure 2:
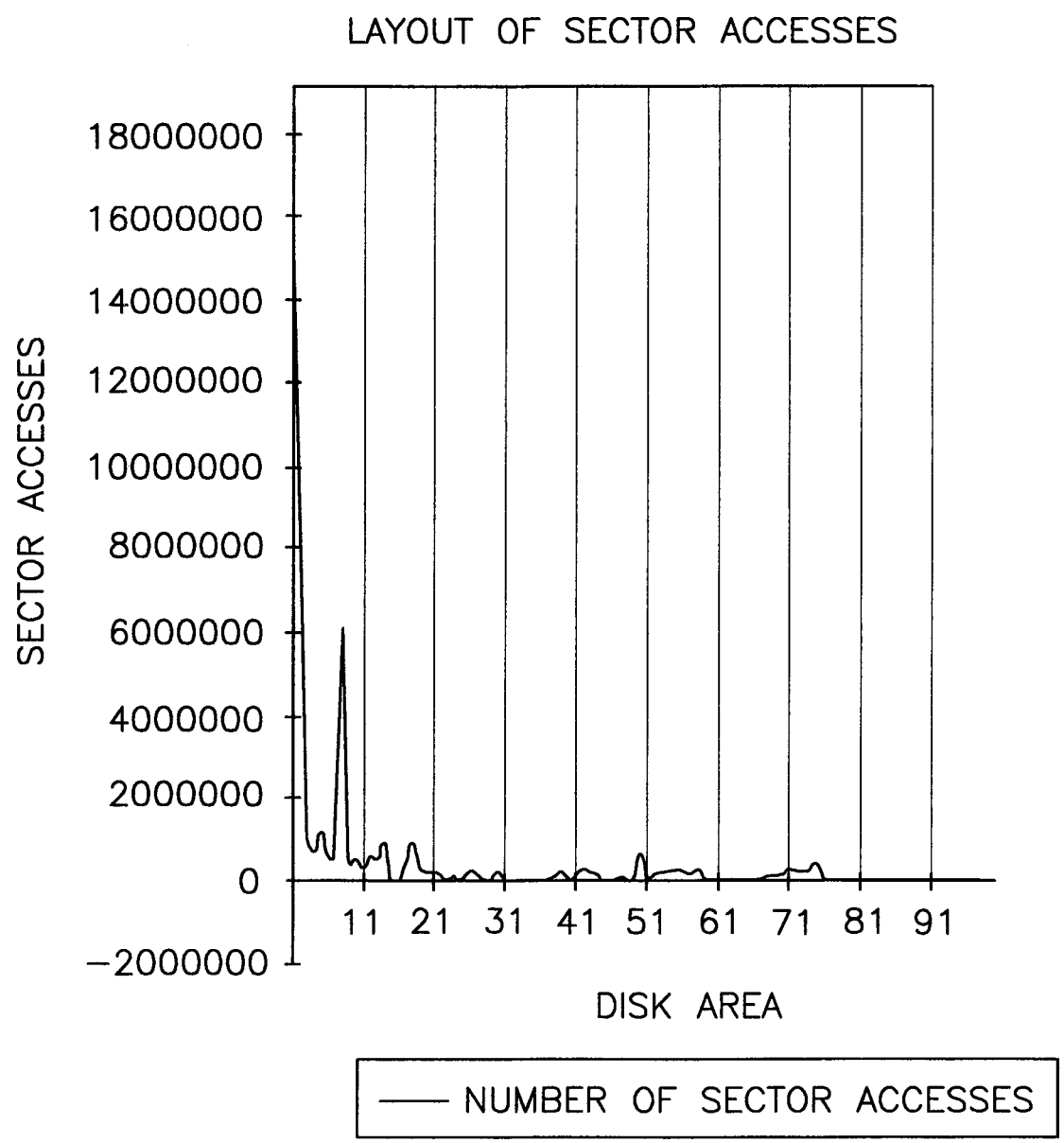
FIG. 2 graphically illustrates typical hard disk access patterns with conventionally defined band boundaries shown.
Figure 3:
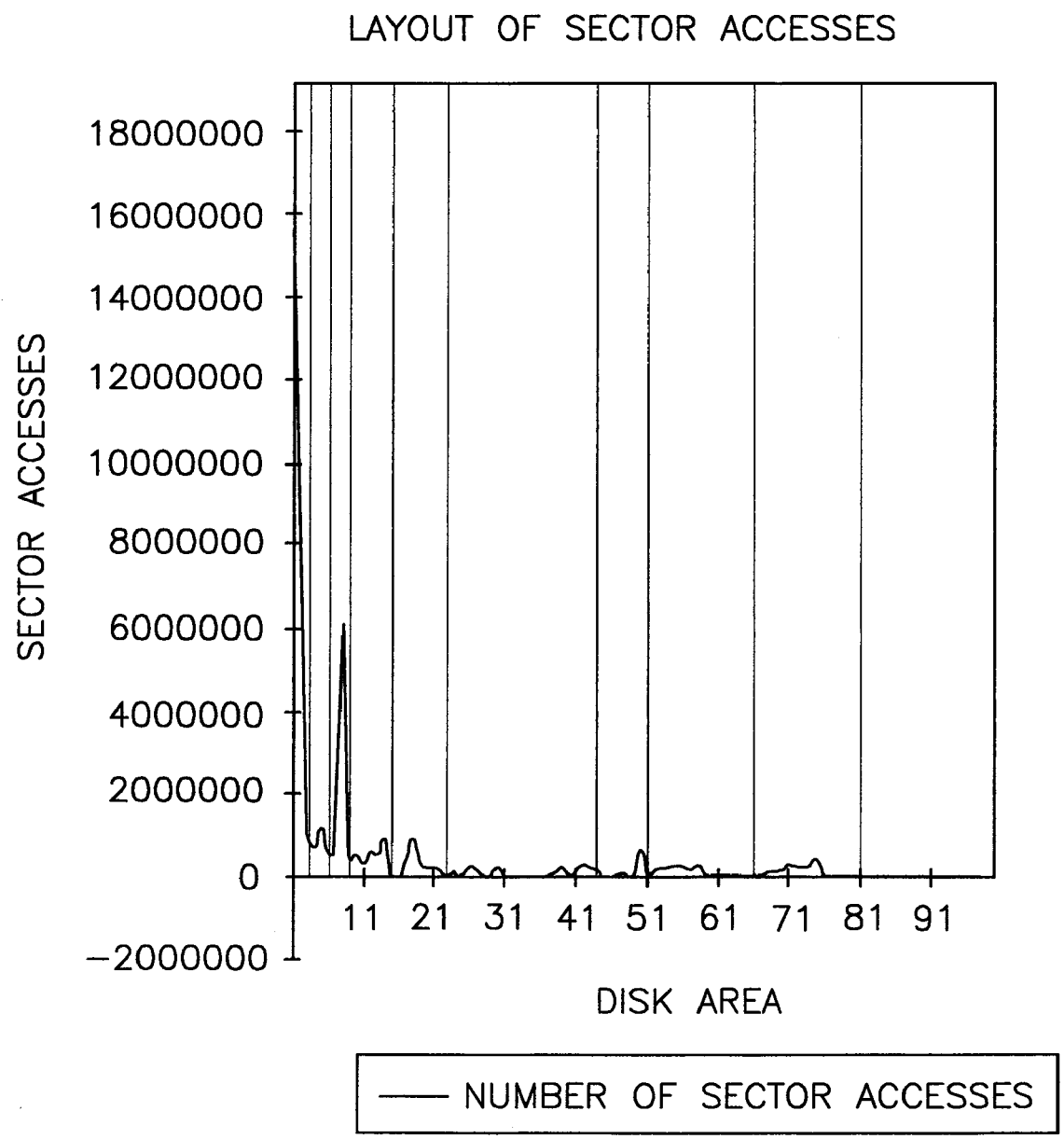
FIG. 3 graphically illustrates typical hard disk access patterns with revised band boundaries shown.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

There is broadly contemplated herein, in accordance with at least one presently preferred embodiment of the present invention, a method for detecting potential ATI problems within bands (groupings of tracks) on a hard drive and scrubbing such a band before data becomes corrupt. The bands can be sized dynamically, based on access counts, to efficiently use system resources while monitoring for ATI. Such a solution can be implemented in hard drive firmware and requires no new or dedicated application or driver. "Scrubbing", as generally understood herein, preferably involves reading data and then writing the same data over itself, to thereby remove any possible effects of ATI.

Conceivably, a count could be kept of the number of accesses to any particular area of the hard disk. When the count reaches a threshold (e.g., 30,000), then any adjacent areas that may be effected by ATI can preferably be rewritten. As such, the sector is the smallest division of the hard disk that is susceptible to ATI. Since the number of sectors is too large to manageably maintain one counter per sector, an aggressive or proactive approach is then desirable by way of assuming a "worst case" at a higher level of hard disk organization. While sectors are organized into tracks, there are usually still too many tracks for which to keep individual counters. However, tracks are organized into bands (i.e., groupings of adjacent tracks), and the number of bands per disk does appear to translate to a more manageable number of counters.

At the same time, bands are essentially not granular enough to efficiently address this problem at hand. In other words, while organizing the present problem at a band level is more manageable in terms of the number of counters that prospectively would be used, the downside is in the large writing area presented by a band, such that to scrub a band in prevention of ATI would prospectively create an enormous strain on drive performance. Thus, there is broadly contemplated herein, in accordance with at least one presently preferred embodiment of the present invention, a highly advantageous approach to striking a balance between the conflicting demands just mentioned. More particularly, in order to maintain a manageable number of band counters while effectively discovering potential ATI, there is proposed herein a scheme of dynamic band sizing that "hones in" on areas of the hard disk which are being written to the most.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Purchase, N.Y. or a workstation computer, such as the Intellistation®, which are sold by International Business Machines (IBM) Corporation of Armonk, N.Y.; however, as will become apparent from the following description, the present invention is applicable to preservation of data on a disk drive by any data processing system.

As shown in FIG. 1, computer system 12 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

FIGS. 2 and 3 graphically illustrate, by way of a non-restrictive example, typical (e.g., historical) disk drive access patterns, where sector accesses are plotted against disk areas (in this case track numbers, or the number of a track as counted radially away from the center of the disk). The difference between FIGS. 2 and 3, on the other hand, is that the former illustrates band boundaries as initially defined, while FIG. 3 illustrates band boundaries as dynamically altered in accordance with a preferred embodiment of the present invention; the band boundaries are indicated by lighter vertical lines drawn to the right of the vertical axis in each figure. Thus, as commonly encountered, band boundaries divide the disk into roughly equivalent bands in accordance with the "initial" arrangement of FIG. 2 whereas in FIG. 3 they now have varying widths. (It should be understood that band boundaries are normally configured initially in firmware at the time of manufacture and may well vary from drive to drive; for ease of illustration the Figures show an initial definition of ten bands, although any appropriate number of bands may be used.)

Accordingly, FIGS. 2 and 3 illustrate that, in accordance with a preferred embodiment of the present invention, an algorithm is preferably applied whereby band sizes are decreased (or band boundaries are shrunk) where there are a large number of writes and increased (or band boundaries are expanded) where there are fewer writes. By so re-defining the boundaries of bands, it is then possible to find a relatively small band that is being written to at a high rate. Then, if needed for averting potential ATI (to the extent that the small band in question would be recognized as a region of significant potential for ATI since the risk of ATI clearly increases with more frequent access), the small band can undergo a background scan for ATI signatures (using essentially any suitable method) and, if needed, be scrubbed by a Read/

Rewrite command much more manageably (and without concomitant strain or degradation in drive performance) than would be the case with a larger band.

Further, it should be appreciated that by redefining band boundaries as just described, the number of access counters (or increment counters) being used can be kept to a reasonable level; whereas a particular counter might be used for a high-access band of smaller width, this will be compensated for with another counter being used for a low-access band of greater width. Thus, the number of counters being used will essentially be no greater than in the case of bands of uniform width.

Preferably, by way of selecting dynamically defined bands for performing a background check for ATI signatures, a suitable threshold can be set based on any of a wide variety of factors, such as the particular disk drive being used or the activity normally encountered in the operating environment in which it is being used. One reasonable threshold might be 30,000 writes in a given band, but of course this number can be varied as deemed appropriate.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
   ascertaining an adjacent track interference potential in a region of a hard drive; and
   averting data corruption via scrubbing data in the region with ascertained adjacent track interference potential;
   said ascertaining comprising defining limits of a region of the hard drive to be scrubbed of data;
   wherein said defining limits comprises:
     establishing initial band boundaries; and
     redefining the initial band boundaries based on a number of writes to one or more bands.

2. The method according to claim 1, wherein said defining limits further comprises:
   in response to ascertaining writing activity,
   shrinking the initial band boundaries for one or more groups of tracks with higher writing activity.

3. The method according to claim 2, wherein said defining limits further comprises expanding the initial band boundaries for one or more groups of tracks with lower writing activity.

4. The method according to claim 3, wherein said scrubbing comprises scrubbing data in a band with shrunken initial band boundaries.

5. The method according to claim 3, wherein said shrinking comprises shrinking the initial band boundaries for one or more groups of tracks with writing activity above a predetermined threshold.

6. The method according to claim 1, wherein said ascertaining comprises performing a background scan on a region of the hard drive with high writing activity.

7. The method according to claim 1, wherein said scrubbing comprises reading data and thereafter rewriting the data.

8. The method according to claim 1, wherein a number of initial bands does not change in response to redefining the initial bands.

9. A system comprising:
   a processor; and
   a memory storing code accessible by the processor to:
     ascertain an adjacent track interference potential in a region of a hard drive; and
     avert data corruption via scrubbing data in the region with ascertained adjacent track interference potential;
   the ascertainment acting to define limits of a region of the hard drive to be scrubbed of data;
   wherein to define limits comprises:
     establishing initial band boundaries; and
     redefining the initial band boundaries based on a number of writes to one or more bands.

10. The system according to claim 9, wherein to define limits further comprises:
    in response to ascertaining writing activity,
    shrinking the initial band boundaries for one or more groups of tracks with higher writing activity.

11. The system according to claim 10, wherein to define limits further comprises expanding the initial band boundaries for one or more groups of tracks with lower writing activity.

12. The system according to claim 11, wherein scrubbing acts to scrub data in a band with shrunken initial band boundaries.

13. The system according to claim 11, wherein to define limits further comprises shrinking the initial band boundaries for one or more groups of tracks with writing activity above a predetermined threshold.

14. The system according to claim 9, wherein the ascertainment acts to perform a background scan on a region of the hard drive with high writing activity.

15. The system according to claim 9, wherein scrubbing acts to read data and thereafter rewrite the data.

16. The system according to claim 9, wherein a number of initial bands does not change in response to redefining the initial bands.

17. A program storage device readable by machine, tangibly embodying a program of instructions executable by the machine to perform acts, said acts comprising:
    ascertaining an adjacent track interference potential in a region of a hard drive; and
    averting data corruption via scrubbing data in the region with ascertained adjacent track interference potential;
    said ascertaining comprising defining limits of a region of the hard drive to be scrubbed of data;
    wherein said defining limits comprises:
      establishing initial band boundaries; and
      redefining the initial band boundaries based on a number of writes to one or more bands.

18. The program storage device according to claim 17, wherein said defining limits further comprises:
    in response to ascertaining writing activity,
    shrinking the initial band boundaries for one or more groups of tracks with higher writing activity.

19. The program storage device according to claim 18, wherein said defining limits further comprises expanding the initial band boundaries for one or more groups of tracks with lower writing activity.

20. The program storage device according to claim 17, wherein a number of initial bands does not change in response to redefining the initial bands.

21. A system comprising:

a graphics adapter;

a processor; and a memory storing code accessible by the processor to:

ascertain an adjacent track interference potential in a region of a hard drive; and avert data corruption via scrubbing data in the region with ascertained adjacent track interference potential;

the ascertainment acting to define limits of a region of the hard drive to be scrubbed of data;

wherein to define limits comprises:

establishing initial band boundaries; and redefining the initial band boundaries based on a number of writes to one or more bands.

22. The system according to claim 21, further comprising an input/output (I/O) controller which is capable of controlling communication between the system and an attached peripheral keyboard.

23. The system according to claim 22, wherein to define limits further comprises:

in response to ascertaining writing activity, shrinking the initial band boundaries for one or more groups of tracks with higher writing activity.

24. The system according to claim 21, wherein the ascertainment acts to perform a background scan on a region of the hard drive with high writing activity.

25. The system according to claim 21, wherein scrubbing acts to read data and thereafter rewrite the data.

26. The system according to claim 21, wherein a number of initial bands does not change in response to redefining the initial bands.

* * * * *